May 6, 1930.                    C. SOLIS                    1,757,024
                              CATTLE GUARD
                            Filed July 23, 1928
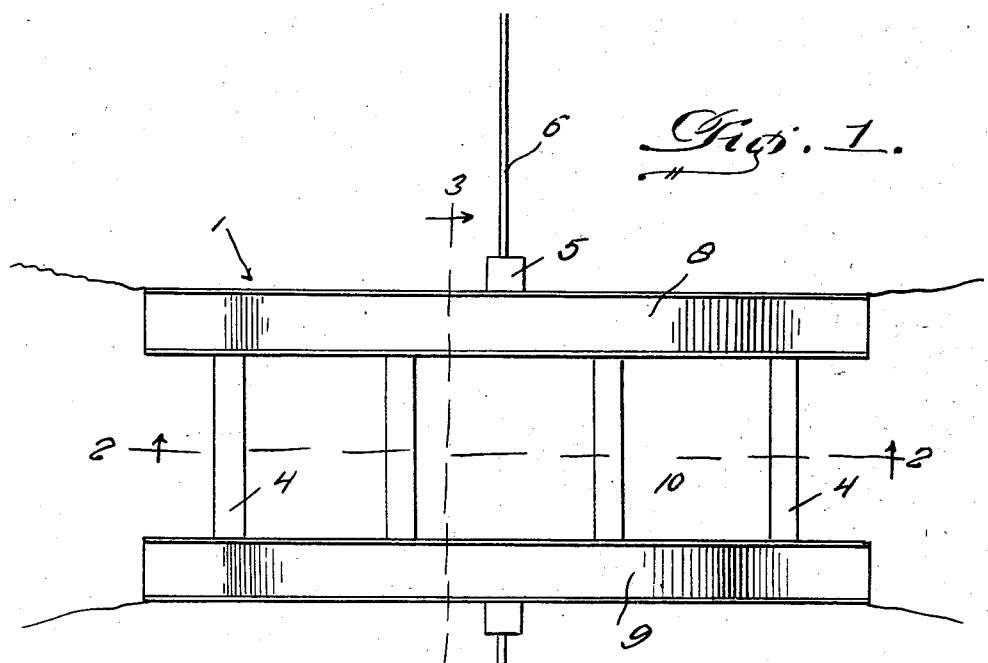
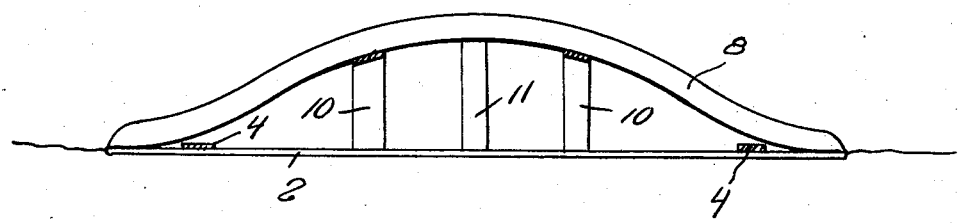
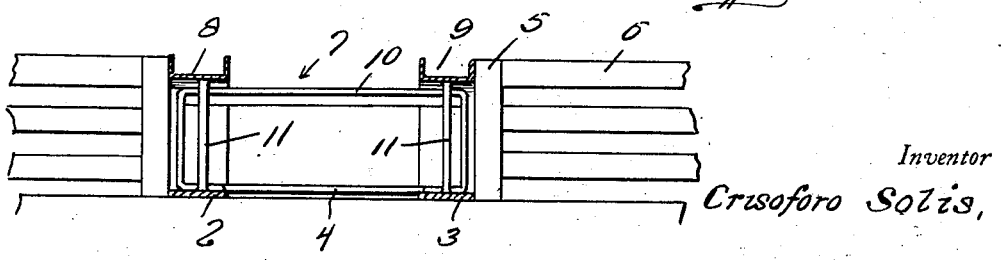
Inventor
Crisoforo Solis,
By Clarence A. O'Brien
Attorney Patented May 6, 1930

1,757,024

UNITED STATES PATENT OFFICE

CRISOFORO SOLIS, OF RIOGRANDE, TEXAS

CATTLE GUARD

Application filed July 23, 1928. Serial No. 294,918.

The present invention relates to improvements in cattle guards and has for its principal object to provide a device that is adapted to be placed in a fence line to prevent cattle, horses, and other live stock from crossing, and yet permit automobiles and other vehicles to pass over the guard without the necessity of the driver having to stop to open a gate.

One of the important objects of the present invention is to provide a cattle guard of the above mentioned character which is simple in construction, inexpensive, strong and durable and further well adapted to the purpose for which it is designed.

Other objects of the invention will become apparent as the nature of the invention proceeds and when taken in connection with the accompanying drawing.

In the accompanying drawing, forming a part of this application and in which like numerals designate like parts throughout the several views:

Figure 1 is a top plan view of the cattle guard embodying my invention, showing the same arranged in a fence line.

Figure 2 is a longitudinal sectional view, taken approximately on the line 2—2 of Figure 1, and Figure 3 is a transverse section taken approximately on the line 3—3 of Figure 1, looking in the direction of the arrows.

In the drawing, wherein for the purpose of illustration is shown the preferred embodiment of my invention, the numeral 1 designates generally my improved cattle guard, the same comprising a pair of parallel spaced base forming sills 2 and 3 respectively, that are interconnected by means of the cross bars 4 and these base members extend transversely between the corner posts 5, provided in the fence line 6, whereby to form a passageway 7.

My improved cattle guard further includes the provision of the arched channeled tracks 8 and 9 respectively, that are arranged above the sills 2 and 3 respectively.

Substantially inverted U-shaped supporting members 10 are provided for the arched portions of the tracks 8 and 9, and additional vertical supports 11 are arranged between the central portion of each sill and the adjacent portion of the respective channeled track, whereby to provide a rigid support for the tracks so that the wheels of the automobile may pass over the cattle guard, in crossing from one side of the fence line to the other. The cross bars 4 as well as the inverted U-shaped supporting members 10 will, however, prevent cattle, horses, and other live stock from crossing to the passage 7 formed in the fence line 6. The supporting members 10 and 11 are secured to the base forming sills and to the underside of the respective tracks by any appropriate fastening means such as by welding, riveting, or the like.

The provision of the cattle guard of the above mentioned character will obviate the necessity of the driver of the vehicle having to stop to open a gate, such as must be done with certain type of cattle guards now in use. Furthermore, the simplicity of my improved cattle guard renders the same inexpensive in its construction, and furthermore can be readily and easily positioned in a fence line, without necessitating any alterations to the fence.

While I have shown the preferred embodiment of my invention, it is to be understood that various changes in the size, shape and arrangement of parts may be resorted to, without departing from the spirit of the invention or the scope of the appended claims.

I claim:

1. A cattle guard comprising a pair of spaced base members, cross bars extending between said base members, arched tracks arranged above the respective base members, supporting means for said tracks, said supporting means comprising inverted U-shaped members extending transversely between the intermediate portions of the arched tracks and secured to the under side thereof and to the respective base members.

2. A cattle guard comprising a pair of spaced members, cross bars extending between said base members, arched tracks arranged above the respective base members, supporting means for said tracks, said supporting means comprising inverted U-shaped members extending transversely between the intermediate portions of the arched tracks and secured to the under side thereof and to the respective base members, and additional vertical supporting members arranged between the central portions of the base members and the adjacent tracks.

In testimony whereof I affix my signature.

CRISOFORO SOLIS.